United States Patent [19]

Drogin

[11] Patent Number: 4,638,321
[45] Date of Patent: Jan. 20, 1987

[54] UNAMBIGUOUS WIDE BASELINE INTERFEROMETER

[75] Inventor: Edwin M. Drogin, Dix Hills, N.Y.

[73] Assignee: Eaton Corporation, Cleveland, Ohio

[21] Appl. No.: 616,098

[22] Filed: Jun. 1, 1984

[51] Int. Cl.$^4$ ............................................. G01S 5/02
[52] U.S. Cl. .................................... 342/444; 342/417
[58] Field of Search ............... 343/417, 387, 389, 390, 343/444, 421, 432, 394

[56] References Cited

U.S. PATENT DOCUMENTS

| | | | |
|---|---|---|---|
| 2,489,304 | 11/1949 | Marchand et al. | 343/432 |
| 3,383,690 | 5/1968 | Keller | 343/421 |
| 3,633,205 | 1/1972 | Lee et al. | 343/444 |
| 3,714,656 | 1/1973 | Meranda | 343/389 |
| 3,789,408 | 1/1974 | Ichihara | 343/394 |
| 3,878,381 | 4/1975 | Broder et al. | 343/417 |
| 3,936,831 | 2/1976 | Jones | 343/444 |

Primary Examiner—Theodore M. Blum
Assistant Examiner—D. Cain
Attorney, Agent, or Firm—D. A. Rowe; V. J. Ranucci

[57] ABSTRACT

The angle of arrival ($\theta$) of an RF signal is determined using only two widely spaced antennas (A, B). A coarse/fine measurement system (40) is disclosed wherein the actual time delay between zero-crossings responsive to the same RF carrier cycle within the pulse envelope arriving at each antenna is determined. There is no need for additional antenna pairs with different baselines to otherwise resolve ambiguity.

20 Claims, 7 Drawing Figures

UNAMBIGUOUS WIDE BASELINE INTERFEROMETER

BACKGROUND AND SUMMARY

The present invention relates to a system for measuring the angle of arrival of an RF signal, using only two widely spaced antennas.

As shown in FIG. 1, the angle of arrival $\theta$ of an RF signal is given by the relation $$\theta = \arcsin \frac{d}{D},$$

where D is the distance or spacing between antennas A and B, d is the remaining distance to antenna A from the RF wavefront upon reaching antenna B, and where the RF source is sufficiently distant so that parallel RF signal paths extend to antennas A and B.

In one known system for determining differential distance d, the time difference of arrival is measured, which enables distance d to be calculated from the known frequency. The RF signal has pulse envelopes of RF carrier cycles. The antennas are widely spaced by many wavelengths and the time difference of arrival of the RF pulse envelopes is measured. This system requires extremely fast rise time pulse envelopes for good accuracy and/or high speed sampling and mathematical correlation of a digitized waveform to determine time delay which matches up detected pulse envelopes from two antennas. Even with these features, accuracy is severely limited.

In another known system, the RF carrier phase difference within the envelope is measured, from which d can be calculated from the known wavelength. This system, however, yields ambiguous results, wherein phase difference will be multiples of 180°, unless antennas are spaced less than a wavelength apart, or multiple antenna pairs are used to resolve the ambiguity.

The present invention addresses and solves the conflicting problems of the above systems. The invention provides a highly accurate system with only a single pair of widely spaced antennas, separated by more than a wavelength. Furthermore, there is no need to resort to multiple antenna pairs to resolve ambiguity.

DESCRIPTION OF THE DRAWINGS

Prior Art

Present Invention

Figure 4:
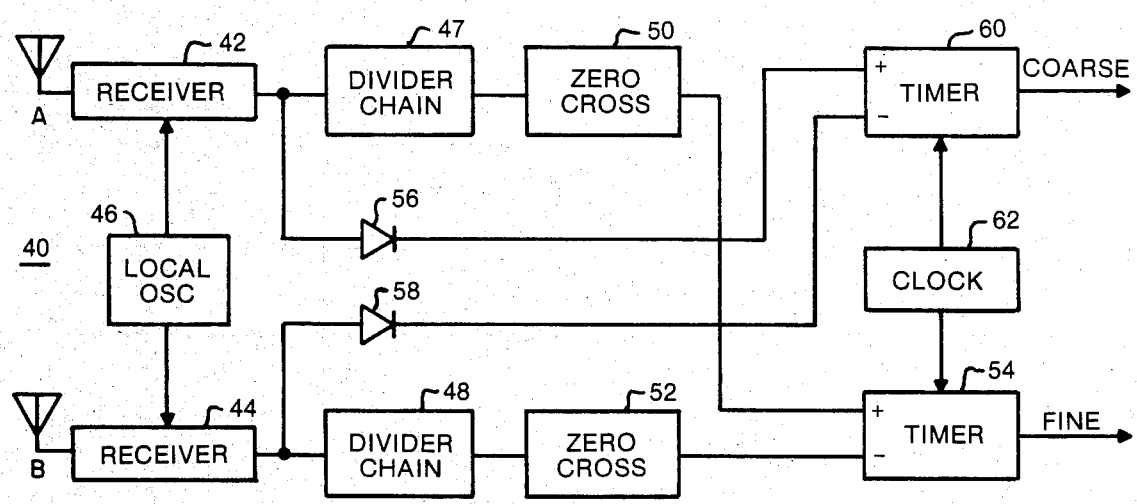

FIG. 4 is a schematic circuit diagram of a system for measuring differential arrival time in accordance with the invention.

Figure 5:
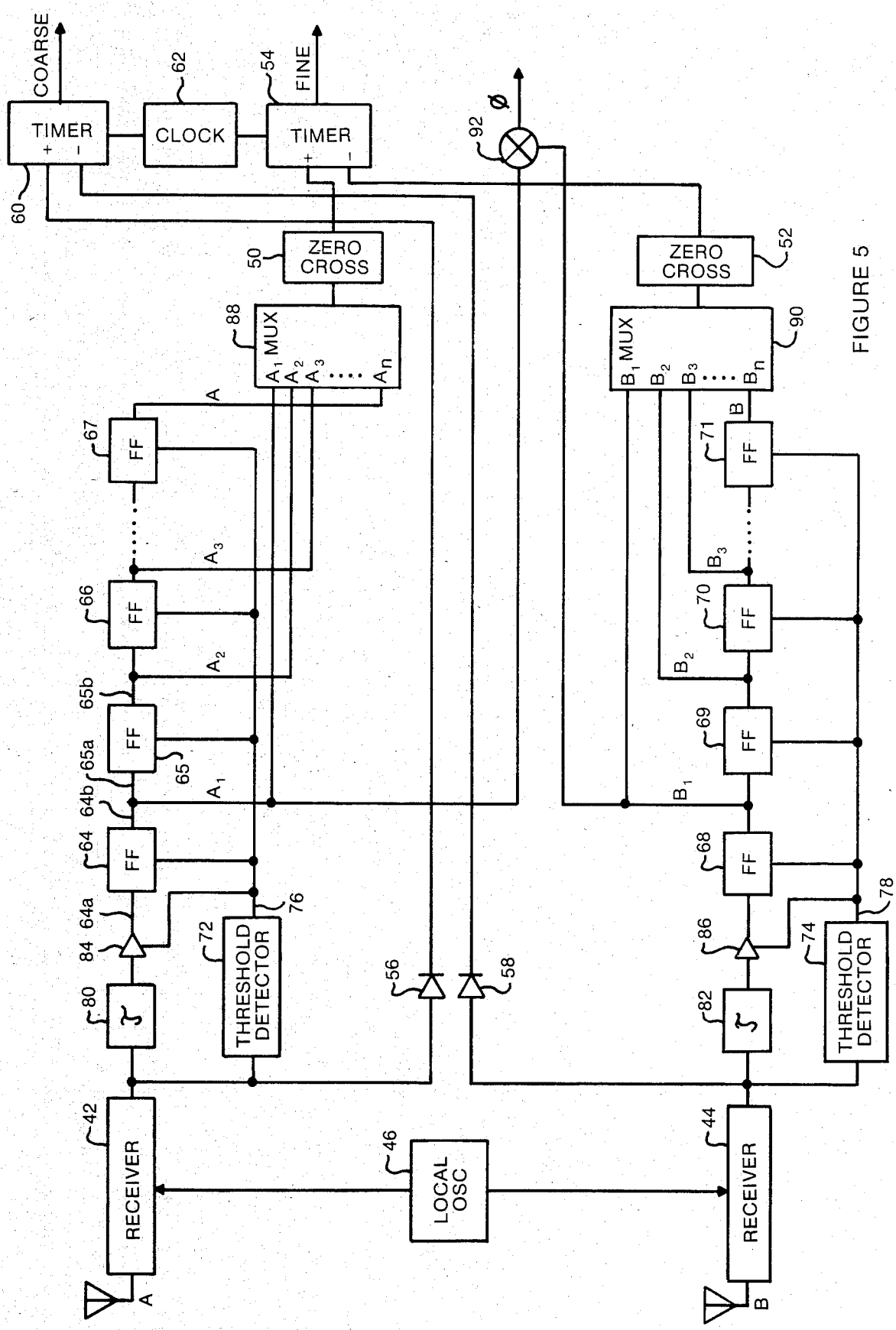

FIG. 5 is a further detailed circuit diagram of the system of FIG. 4, including various alternatives.

Figure 6:
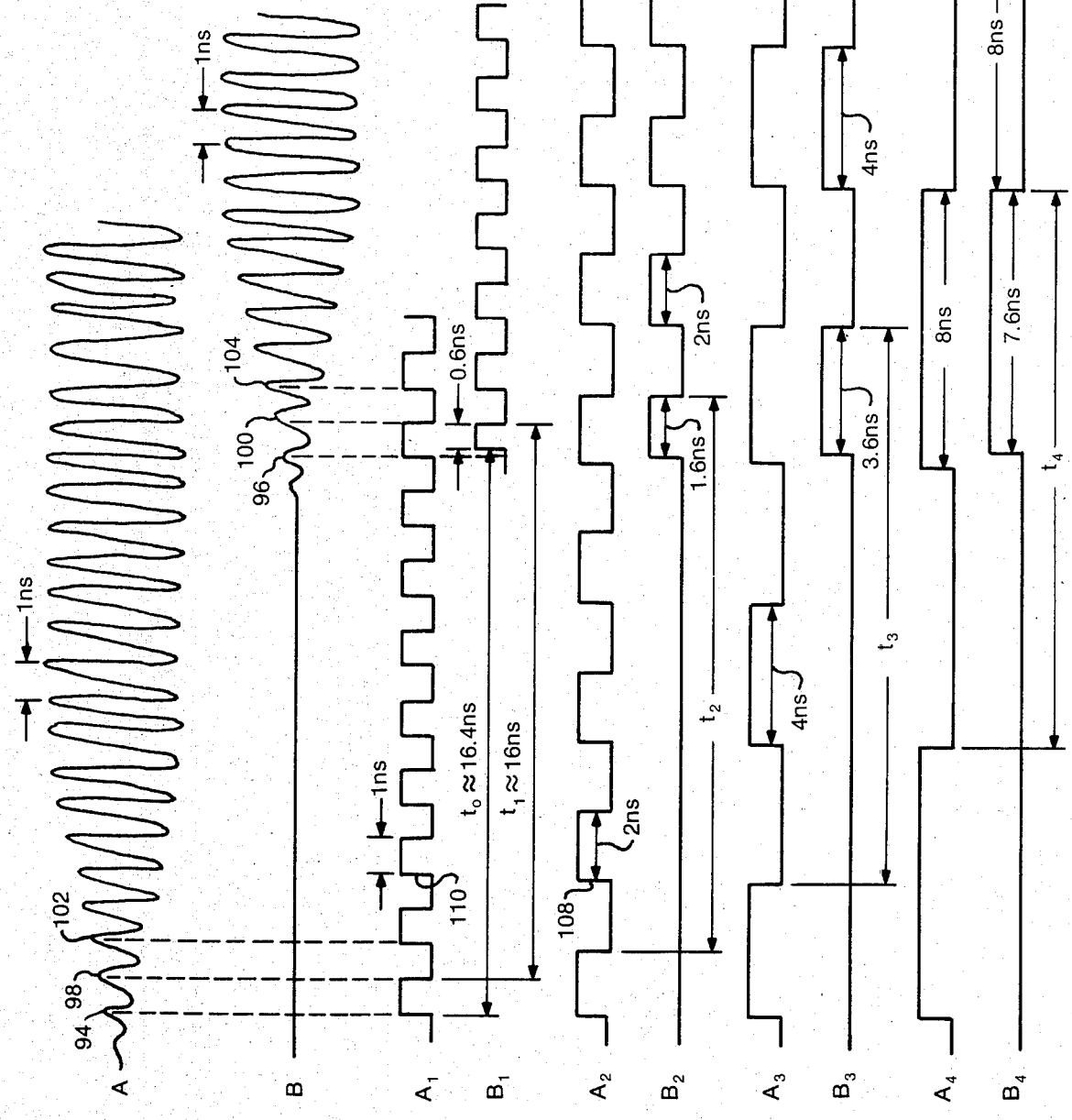

FIG. 6 is a timing diagram illustrating operation of the circuit of FIG. 5.

Figure 7:
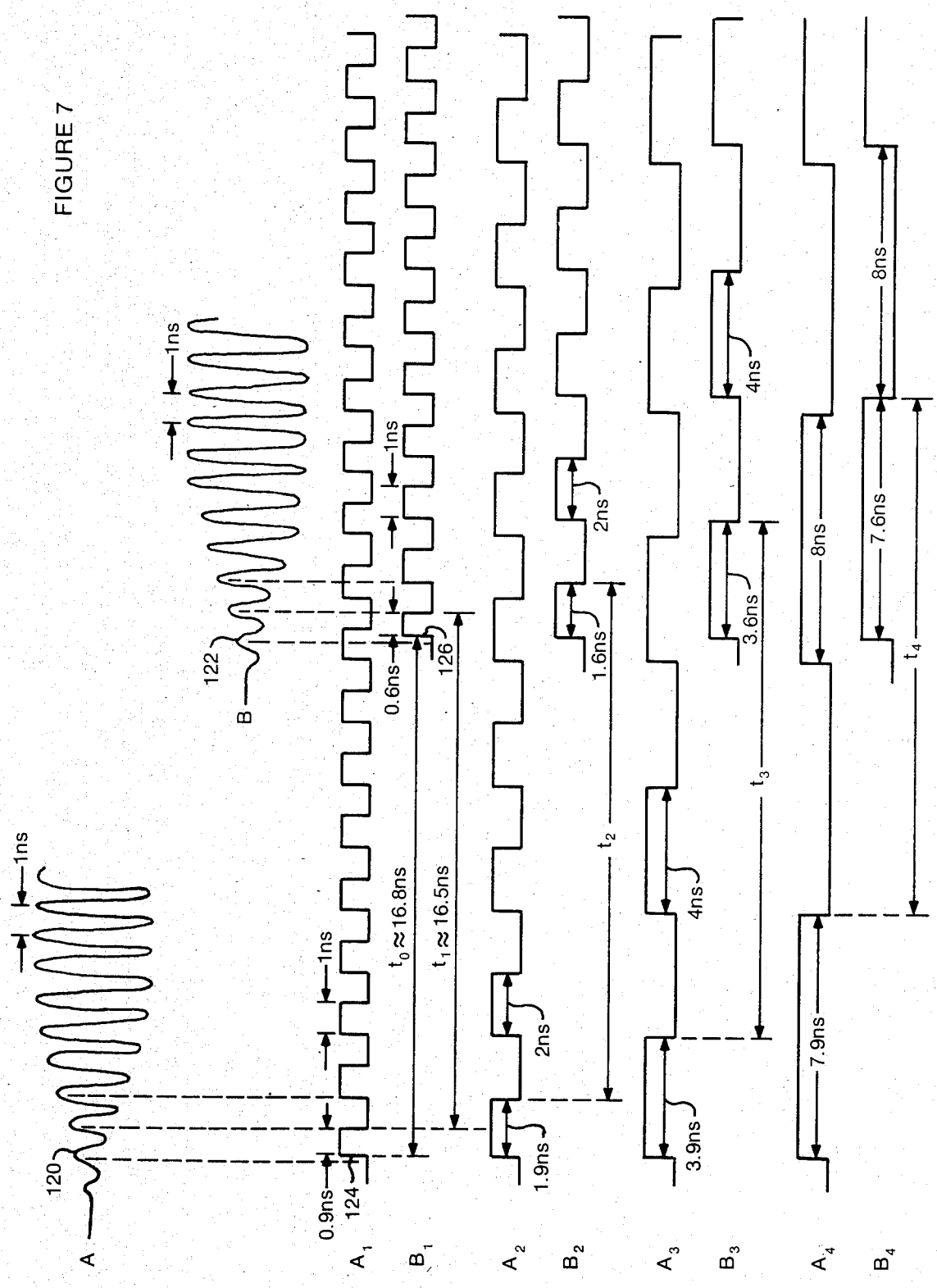

FIG. 7 is a timing diagram illustrating another sequence of operation of the circuit of FIG. 5.

DESCRIPTION OF PRIOR ART

Figure 1:
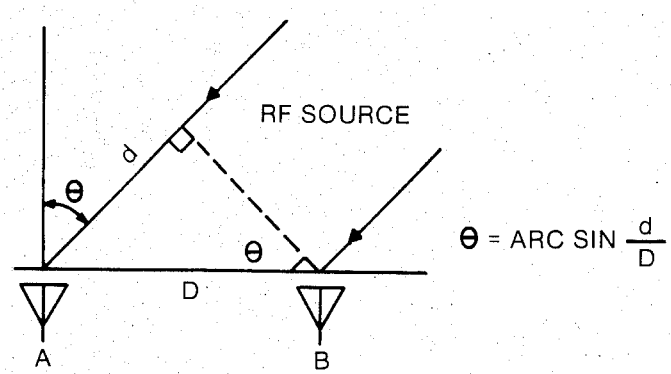
FIG. 1 is a diagramatic illustration of RF signal arrival at a pair of spaced antennas.
Figure 2:
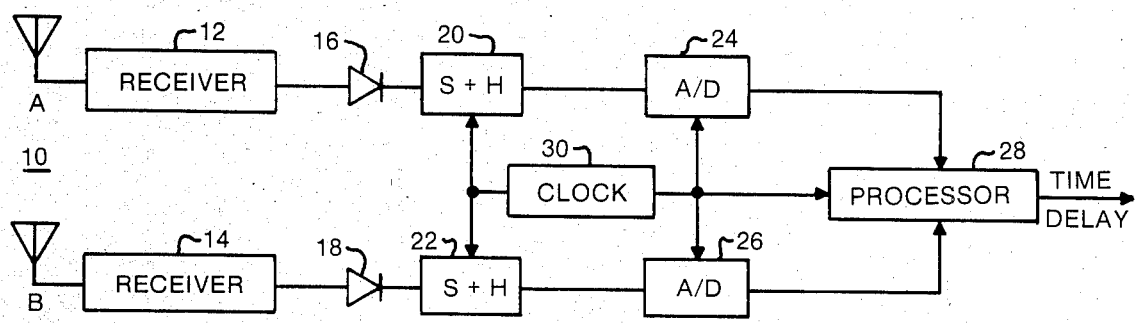
FIG. 2 is a schematic circuit diagram of one known prior art system for determining arrival angle by measuring differential arrival time.

There is shown in FIG. 2 a wide baseline time domain interferometer system 10 for measuring the time A and B which are widely spaced to provide a long baseline which in turn maximizes the time difference of arrival. A pair of matched or calibratable stable delay receivers 12 and 14 convert the incoming RF signal to a lower frequency RF signal such as narrow band matched IF to optimize signal to noise ratio. The signal is then detected for example as shown at diodes 16 and 18. After detection, high speed sample and hold circuits 20, 22 and analog to digital converters 24, 26 convert the analog pulse envelope to sampled data digital form. A processor or digital computer 28 cross-correlates the two digitized waveforms and derives a best estimate of time delay. A common clock 30 coordinates timing. The accuracy which can be achieved depends heavily on pulse envelope rise time, signal to noise ratio, and multi-path contamination after the leading edge, and is typically in the range of about 1–10 ns (nanoseconds).

Figure 3:
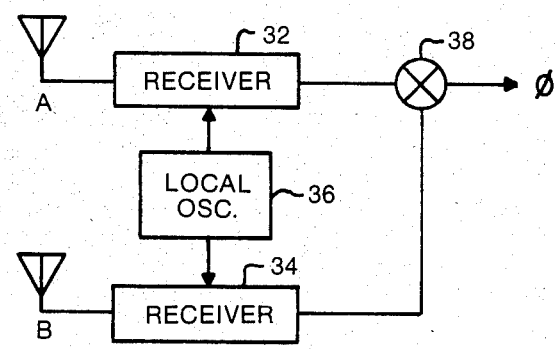
FIG. 3 is a schematic circuit diagram of another known prior art system for determining arrival angle by measuring phase difference.

FIG. 3 illustrates another known prior art system, wherein phase difference is measured. The signals from antennas A and B are sent to matched receivers 32 and 34 which are stable in phase delay. Down-conversion to a lower frequency RF, such as IF, is permissible if a stable single local oscillator 36 is used as the reference for each conversion, since the phase difference will not change. The outputs of receivers 32, 34 are applied to a heterodyne mixer 38 which outputs the difference in phase $\phi$. In this system, the RF carrier phase difference within the pulse envelope is measured. As above noted, this system yields ambiguous results unless antennas A and B are spaced less than a wavelength apart, or multiple antenna pairs are used to resolve the ambiguity.

DESCRIPTION OF THE INVENTION

FIG. 4 shows a system 40 in accordance with the invention for receiving an RF signal having envelopes of RF carrier cycles and measuring the differential arrival time of the RF signal at two antennas A and B spaced apart by a distance greater than one wavelength of the RF carrier. Conventional receivers 42 and 44 may optionally be included if down-conversion or a high signal to noise ratio is desired. With this option, a common local oscillator 46 is provided, so that phase difference will not change. For clarity herein, RF signals from antennas A and B which have been converted by heterodyne receivers or the like such as 42, 44 to lower frequency RF signals, such as IF, will still be referred to as RF signals.

First and second digital counter divider means 47 and 48, one for each antenna, respond to the RF signal from their respective antennas and each output one or more digital submultiples of the RF carrier and preserve RF carrier phase differential. The time difference between the digital submultiples of the RF carrier from the antennas is measured by first and second zero-crossing detectors 50 and 52 responsive to the outputs of their respective dividers, and by a timer 54 responsive to zero-crossing detectors 50, 52 for measuring the time difference between a zero-crossing responsive to antenna A and a zero-crossing responsive to antenna B.

Each of dividers 47, 48 comprises a divider chain outputting a plurality of different frequency submultiples of the RF carrier. In an exemplary embodiment, a high speed binary or modulo-n divider is employed which is capable of dividing down an RF carrier of for example 4–10 GHz to a low square wave freqency of for example 20 MHz, where there are two cycles of square wave in as narrow as a 100 ns RF pulse envelope width. The dividers preserve the true time difference between zero-crossings, i.e., the time delay between the same square wave zero-crossings at the outputs of dividers 47 and 48 will be identical to the time delay between the first RF cycle which caused the two divider chains to start counting. This time delay can be measured to better than 1 ns accuracy because the lower frequency digital submultiples of the RF carrier output by the divider chains have the noted zero-crossing transitions occuring mid-envelope, thus affording an accurate fine measurement. At high RF, e.g., 10 GHz, a slip of a few RF cycles in relative divider chain start causes only a fraction of a nanosecond error in measured time difference.

A coarse measurement may be provided by envelope detection means such as shown at diodes 56 and 58 for detecting envelope arrival at the antennas which, in combination with the noted accurate mid-envelope zero-crossing detection, provides an unambiguous measure of differential arrival time. Threshold detection at the beginning of an envelope is coarse because it is subject to jitter, noise and the rising amplitude slope of the pulse envelope. Timer 60 measures the coarse differential, and clock 62 provides a common timing reference for the timers. In the exemplary embodiment, simple inexpensive envelope threshold detectors 56 and 58 may be used, for example accurate only to ±25 ns, because of the fine measurement provided by the dividers which preserve RF carrier phase differential by providing the same time delay between the square wave transitioning zero-crossings at the outputs of dividers 47 and 48 as the time delay between the differentially arriving RF cycle triggering and starting the dividers.

In FIG. 5, divider chain 46 is provided by a plurality of series ganged flip-flops such as 64–67, and divider chain 48 is provided by a plurality of series ganged flip-flops such as 68–71. The flip-flops provide a plurality of different frequency submultiples of the initial input, in known manner. For example, a positive-going transition at input 64a of flip-flop 64 causes output 64b to transition to an alternate state either positive-going or negative-going. If 64b is positive-going, then 65a connected thereto is likewise positive-going and flip-flop 65 switches such that its output 65b transitions to an alternate state. If 64b, and hence 65a, is negative-going, then flip-flop 65 does not switch and output 65b does not transition, but rather waits until the next positive-going transition of 64b, 65a, and so on.

First and second threshold detector means 72 and 74 are responsive to the RF signal for enabling the respective divider chains by providing an enable or gate signal on respective lines 76 and 78 to the enable inputs of the flip-flops. First and second delay means 80 and 82, one for each antenna, delay the RF signal to the respective divider chain such that the enabling signal on respective lines 76 and 78 from respective threshold detectors 72 and 74 reach the respective divider chain before the RF signal i.e., delays 80, 82 delay the RF signal so that the measurement circuitry can be enabled before leading edge impinges the first flip-flop in each chain. The divider chain is thus enabled and ready to divide the RF carrier to the noted submultiples. First and second limiting amplifiers 84 and 86, one for each antenna, are connected between the respective delay means and divider chain, and are enabled by the enable signal on respective lines 76 and 78 from respective threshold detectors 72 and 74. The RF signal from the antennas A and B, or the noted reduced frequency RF signals such as IF through receivers 42 and 44, passes to the noted respective delay means 80, 82, then to limiting amplifiers 84, 86, then to divider chains 47, 48, provided by flip-flops 64–67, 68–71, and then to zero-crossing detectors 50, 52. Limiting amplifiers 84, 86 provide a strong signal to the first flip-flop in the chain, if desired, but should be limited to prevent amplification of noise, preceeding the detector signal, from triggering the flip-flops. Threshold detectors 72, 74 enable the measurement circuits only for signals well above the noise level.

The divider means may include means such as multiplexers 88, 90 for selectively choosing a given submultiple of the RF carrier to be detected by respective zero-crossing detectors 50, 52. For example, any of submultiples $A_1$ through $A_n$ may be chosen for detection, and likewise for submultiples $B_1$ through $B_n$ from antenna B. The further subdivided or lower frequency submultiple that is chosen, the further into the pulse envelope will be the zero-crossing detection, and the greater the accuracy. In other implementations, some or all of the various submultiples may be tallied and cross-correlated, averaged, and so on. A heterodyne mixer 92 may be provided in combination for detecting RF carrier phase differential to provide a further accurate fine measure of differential arrival time. Mixer 92 has one input coupled to the highest frequency submultiple $A_1$ of the first divider chain from antenna A, and another input coupled to the same highest frequency submultiple $B_1$ of the second divider chain from antenna B.

Referring to FIG. 6, a 1 GHz RF carrier is shown at antenna A and a delayed arrival thereof is shown at antenna B. Flip-flop 64 having output $A_1$ is shown triggered at a given RF cycle above a certain threshold, and triggered at every RF cycle thereafter. The frequency of $A_1$ is half that of the RF carrier, and the pulse width of the digital waveform $A_1$ is 1 ns. In this example, the RF signal is assumed to arrive at antenna B exactly 16 RF cycles later, i.e., 16 ns. Flip-flop 68 should thus be triggered exactly 16 ns later than the triggering of flip-flop 64, and the first positive going transition of $B_1$ should be exactly 16 ns later than the first positive going transition of $A_1$. This time delay is shown at $t_0$. As shown, however, $t_0$ is approximately 16.4 ns. This is because the first triggering cycle is typically close to the triggering threshold, and a difference in firing time may result due to the rising slope of the pulse amplitude as well as jitter and noise. In the example shown, the first triggering cycle at $B_1$ is delayed by an additional 0.4 ns. This inaccuracy will likely also occur at the first firing cycle in $A_1$, though such is not shown for explanation purposes.

It is thus seen that the first triggering RF cycle 94 at antenna A starts an interval $t_0$ which is terminated by the first triggering RF cycle 96 at antenna B, with some allowance for inaccuracy as noted. The second RF triggering cycle 98 starts another interval $t_1$ which is terminated by the second RF triggering cycle 100 at antenna B, assuming no cycles are missed. The third triggering RF cycle 102 at antenna A starts an interval $t_2$, as shown on timing line $A_2$, $B_2$, which is terminated by the third RF triggering cycle 104 at antenna B. Time delay interval $t_2$ starts and ends two RF cycles after initial time delay interval $t_0$. Time delay interval $t_3$ on timing line $A_3$, $B_3$, starts with negative-going transition 106 of $A_3$, which corresponds to positive-going transition 108 of $A_2$, which corresponds to positive-going transition 110 of $A_1$. The interval $t_3$ thus starts on the fifth triggering RF cycle, four RF cycles later than the start of $t_0$. In like manner, $t_4$ starts at the ninth RF triggering cycle.

In the example shown, it is assumed that the second RF triggering cycle 98, 100 has risen sufficiently to eliminate inaccuracies due to pulse rise slope, noise and the like, and thus $t_1$ is shown as having a length of 16 ns. This may or may not be valid. In general, the farther away from the beginning of the pulse envelope, the more accurate the measurement. Thus, $t_4$ is more accurate than $t_3$, which is more accurate than $t_2$, and so on, in measuring the delay time interval of arrival. A series of measurements can be made at various stages or different frequency submultiples of the divider chains, such as $A_1$ through $A_n$, and $B_1$ through $B_n$, and averaged, to reduce the effect of uncorrelated noise between the two arrival channels from antennas A and B, resulting in improved accuracy. The divider counters keep a tally of the number of zero-crossings that have occurred due to the identical signal at each antenna. In addition to the averaging and/or selective multiplexing as shown, the signal can be frequency modulated or phase coded.

FIG. 7 is similar to FIG. 6, but shows an arbitrarily chosen fractional cycle difference of 0.5 ns, which is one-half cycle. Both the initial RF triggering cycles 120 and 122 for the A and B antennas, respectively, are shown to result in slightly inaccurate triggering of lead flip-flops 64 and 68, as shown at transition 124 in $A_1$ which is offset by 0.1 ns, and by transition 126 in $B_1$ which is offset by 0.4 ns. It is further assumed that the flip-flops are accurately triggered by the next RF cycle as shown at negative-going transition 128 in $A_1$, and 130 in $B_1$, whereby the length of the first pulse in $A_1$ is 0.9 ns, and the length of the first pulse in $B_1$ is 0.6 ns. In this example, $t_0$ thus has a duration of 16.8 ns. The interval t, reflects the true time delay of 16.5 ns. As in FIG. 6, the further divided or counted submultiples are more accurate, and thus $t_4$ is the most accurate of the delay intervals shown because it has zero-crossing transitions farther away from the beginning of the envelope. These mid-envelope transitions have less chance of being affected by those inaccuracy-producing factors which affect transitions at the beginning of a pulse envelope, as exemplified by $t_0$.

While counters or dividers are shown and preferred, other digital triggering means may be used. If two matched trigger circuits fire on the same RF cycle, the time delay of arrival should be highly accurate, and there would be no need for further division or counting unless further accuracy were desired. The counter or divider chain refines the measurement so that considerably greater accuracy can be obtained, if required. If averaging is to be done, the counters or dividers tally the number of zero-crossings. The noted transitions enable extremely accurate interval measurement. This time delay can be measured to better than one-half ns accuracy by a timer such as shown in my co-pending U.S. patent application Ser. No. 06/385,900, filed June 7, 1982. The enablement of extremely accurate fine time delay measurement provided by the invention is a significant advance in interferometry implementations.

It is recognized that various modifications are possible within the scope of the appended claims.

I claim:

1. In a system for receiving an RF signal having envelopes of RF carrier cycles, said RF carrier cycles having zero crossings, means for measuring the differential arrival time of said RF signal at two antennas spaced apart by a distance greater than one wavelength of the RF carrier, comprising first and second triggering means, one for each antenna, each said first and second triggering means having a digital output, said first and second triggering means being responsive to said zero crossings of said RF carrier cycles from its respective said antenna and providing outputs preserving RF carrier phase differential from said antennas, and timer means for measuring the time difference between said outputs of said first and second triggering means.

2. The invention according to claim 1 comprising in combination means for detecting envelope arrival at said antennas to provide a coarse measure of said differential arrival time, and, in combination with said timer means, an unambiguous fine measure of said differential arrival time.

3. The invention according to claim 2 comprising in further combination heterodyne mixer means for detecting RF carrier phase differential from said antennas to provide a further accurate fine measure of said differential arrival time.

4. In a system for receiving an RF signal having envelopes of RF carrier cycles, means for measuring the differential arrival time of said RF signal at two antennas spaced apart by a distance greater than one wavelength of the RF carrier, comprising first and second digital counter divider means, one for each antenna, responsive to said RF signal from its respective said antenna and outputting one or more digital submultiples of said RF carrier and preserving RF carrier phase differential from said antennas, and means for measuring the time difference between said digital submultiples of said RF carrier from said antennas.

5. The invention according to claim 4 wherein said last mentioned means comprises first and second zero-crossing detector means, one for each antenna, responsive to the output of respective said divider means, and timer means responsive to said first and second zero-crossing detector means for measuring the time difference between a zero-crossing from said first divider means triggered from said first antenna and a zero-crossing from said second divider means triggered from said second antenna.

6. The invention according to claim 5 wherein each of said first and second divider means comprises a divider chain outputting a plurality of different frequency said submultiples of said RF carrier, and means for selectively choosing a given said submultiple to be detected by its respective said zero-crossing detector means such that a mid-envelope zero-crossing is detected, whereby to afford a more accurate measurement than envelope threshold detection at the beginning of an envelope.

7. The invention according to claim 6 comprising in combination:

first and second threshold detector means, one for each antenna, responsive to said RF signal for enabling the respective said divider chain; and first and second delay means, one for each antenna, for delaying said RF signal to the respective said divider chain such that the enabling signal from the respective said threshold detector means reaches said divider chain before said RF signal, whereby said divider chain is enabled and ready to divide said RF carrier to said submultiples before arrival of the first RF triggering carrier cycle.

8. The invention according to claim 7 comprising first and second limiting amplifier means, one for each antenna, connected between respective said delay means and divider chain, and enabled by respective said threshold detector means.

9. The invention according to claim 8 further comprising first and second receiver means, one for each antenna, between respective said delay means and antenna, and converting a received RF signal to a lower frequency RF signal, such as IF, for passage to respective said delay means, limiting amplifier means, divider chain and zero-crossing detector means.

10. The invention according to claim 6 comprising in combination means for detecting envelope arrival at said antennas to provide a coarse, and, in combination with said accurate mid-envelope zero-crossing detection, an unambiguous measure of said differential arrival time.

11. The invention according to claim 6 comprising in combination means for detecting RF carrier phase differential at said antennas to provide a further accurate fine measure of said differential arrival time.

12. The invention according to claim 11 wherein said last mentioned means comprises a heterodyne mixer having one input coupled to a given digital frequency submultiple of said first divider chain and another input coupled to the same given digital frequency submultiple of said second divider chain.

13. The invention according to claim 12 wherein said inputs of said heterodyne mixer are connected to the highest frequency submultiple of said first and second divider chains.

14. In a system for receiving an RF signal having envelopes of RF carrier cycles, means for measuring the differential arrival time of said RF signal at two antennas spaced apart by a distance greater than one wavelength of the RF carrier, comprising:
  first and second digital counter divider means, one for each antenna, responsive to said RF signal from its respective said antenna and outputting one or more digital transitions in response to said RF carrier and preserving RF carrier phase differential from said antennas;
  first and second transition detector means responsive to the output of respective said divider means;
  timer means responsive to said first and second transition detector means for measuring the time difference between a transition detection from said first divider means triggered from said first antenna and a transition detection from said second divider means triggered from said second antenna, to provide a fine measure of said differential arrival time;
  means for detecting envelope arrival at said antennas to provide a coarse, and, in combination with said fine measure, an unambiguous measure of said differential arrival time.

15. The invention according to claim 14 wherein said divider means include means providing mid-envelope transitions delayed from the beginning of an envelope and preserving true time difference between said delayed mid-envelope transitions from said first and second antennas relative to the time difference between envelope initiation at said first and second antennas, and wherein said transition detection means respond to said mid-envelope transitions such that said timer means measures the time difference therebetween.

16. The invention according to claim 15 comprising:
  first and second threshold detector means, one for each antenna, responsive to said RF signal or enabling the respective said divider means;
  first and second delay means, one for each antenna, for delaying said RF signal to the respective said divider means such that the enabling signal from the respective said threshold detector means reaches said divider means before said RF signal, whereby said divider means is enabled and ready to divide said RF carrier to said submultiples before arrival of the first RF carrier triggering cycle;
  first and second limiting amplifier means, one for each antenna, connected between respective said delay means and divider means, and enabled by respective said threshold detector means; and
  heterodyne mixer means having one input coupled to said first divider means and another input coupled to said second divider means.

17. In a system for receiving an RF signal having envelopes of RF carrier cycles, means for measuring the differential arrival time of said RF signal at two antennas spaced apart by a distance greater than one wavelength of the RF carrier, comprising:
  first and second digital counter divider chains, one for each antenna, responsive to said RF signal from its respective said antenna and outputting a plurality of different frequency digital submultiples of said RF carrier and preserving RF carrier phase differential from said antennas;
  first and second zero-crossing detector means, one for each antenna, responsive to the output of respective said divider chains;
  first and second means, one for each zero-crossing detector, for selectively choosing a respective given said digital submultiple to be detected by its respective said zero-crossing detector such that a mid-envelope zero-crossing is detected;
  timer means responsive to said first and second zero-crossing detector means for measuring the time difference between a mid-envelope zero-crossing from said first divider chain responsive to said first antenna and a mid-envelope zero-crossing from said second divider chain responsive to said second antenna;
  first and second threshold detector means, one for each antenna, responsive to said RF signal for enabling the respective divider chain;
  first and second delay means, one for each antenna, for delaying said RF signal to the respective said divider chain such that the enabling signal from the respective said threshold detector means reaches said divider chain before said RF signal, whereby said divider chain is enabled and ready to divide said RF carrier to said digital submultiples before arrival of the leading RF carrier triggering cycle;
  first and second limiting amplifier means, one for each antenna, connected between respective said delay means and divider chain, and enabled by respective said threshold detector means;
  first and second receiver means, one for each antenna, connected between respective said delay means and antenna, and converting a received RF signal to a lower frequency, such as IF, for passage to respective said delay means, limiting amplifier means, divider chain and zero-crossing detector means;
  means for detecting envelope arrival at said antennas to provide a coarse, and, in combination with said accurate mid-envelope zero-crossing detection, an unambiguous measure of said differential arrival time; and heterodyne mixer means having one input coupled to a given frequency digital submultiple of said first divider chain and another input coupled to the same given frequency submultiple of said second divider chain, for detecting RF carrier phase differential at said antennas to provide a further accurate fine measure of said differential arrival time.

18. In a system receiving an RF signal having envelopes of RF carrier cycles, a technique for measuring the differential arrival time of said RF signal at two antennas spaced apart by a distance greater than one wavelength of the RF carrier, comprising in combination:

detecting envelope arrival at said antennas to provide a coarse measure of said differential arrival time; and detecting RF phase differential at said antennas to provide, in combination with said coarse measure, an unambiguous fine measure of said differential arrival time.

19. The invention according to claim 18 comprising detecting said RF phase differential by digitally dividing the RF carrier and preserving RF carrier phase differential from said antennas, and measuring the time difference between said digitally divided RF carrier from said antennas.

20. The invention according to claim 19 comprising further detecting said RF phase differential by heterodyne mixing the RF carrier from said antennas.

* * * * *